United States Patent [19]

Meyer

[11] Patent Number: 5,867,733
[45] Date of Patent: Feb. 2, 1999

[54] MASS DATA STORAGE CONTROLLER PERMITTING DATA TO BE DIRECTLY TRANSFERRED BETWEEN STORAGE DEVICES WITHOUT TRANSFERRING DATA TO MAIN MEMORY AND WITHOUT TRANSFERRING DATA OVER INPUT-OUTPUT BUS

[75] Inventor: James W. Meyer, Shoreview, Minn.

[73] Assignee: Micron Electronics, Inc., Nampa, Id.

[21] Appl. No.: 657,968

[22] Filed: Jun. 4, 1996

[51] Int. Cl.$^6$ .................................................. G06F 13/00
[52] U.S. Cl. ............................................ 395/894; 711/112
[58] Field of Search .................................. 395/287, 294, 395/842, 821, 200.42, 828, 309, 894; 711/112, 2

[56] References Cited

U.S. PATENT DOCUMENTS

| | | | |
|---|---|---|---|
| 5,434,722 | 7/1995 | Bizjak et al. | 360/69 |
| 5,444,855 | 8/1995 | Thompson | 395/287 |
| 5,446,877 | 8/1995 | Liu et al. | 395/180 |
| 5,461,721 | 10/1995 | Cormier et al. | 711/2 |
| 5,546,547 | 8/1996 | Bowes et al. | 395/294 |
| 5,566,306 | 10/1996 | Ishida | 395/309 |
| 5,590,377 | 12/1996 | Smith | 395/842 |
| 5,603,050 | 2/1997 | Wolford et al. | 395/821 |
| 5,627,968 | 5/1997 | Ozaki et al. | 395/200.42 |
| 5,649,233 | 7/1997 | Chen | 395/828 |

OTHER PUBLICATIONS

Stallings, William, *Computer Organization and Architecture: Designing for Performance*, 4$^{th}$ ed., Prentice–Hall, New Jersey, pp. 65–85 and 199–219, 1996.

Norton, Peter et al., *Peter Norton's Inside the PC*, Sams Publishing, Indiana, pp. 174–177, 1995.

SFF Committee Information Specification for *Bus Masters Programming Interface for IDE ATA Controllers*, Annex D, pp. 2–8, 1994.

*Primary Examiner*—Thomas C. Lee
*Assistant Examiner*—David Ton
*Attorney, Agent, or Firm*—Seed and Berry LLP

[57] ABSTRACT

A system provides for direct transfer of data from one mass storage device, such as a hard disk drive, to another storage device, through an EIDE controller. Data from one disk drive, on one of the primary or secondary EIDE channels, is routed through the EIDE controller, to another disk drive on the other EIDE channel. The EIDE controller employs a pair of multiplexers and block move buses that allow data to be selectively routed between the primary and secondary EIDE channels. The processor in a host PC need only initialize the transfer with a few commands. Thereafter, the EIDE controller performs all block data transfers between the hard disk drives, without additional processor involvement.

22 Claims, 5 Drawing Sheets

MASS DATA STORAGE CONTROLLER PERMITTING DATA TO BE DIRECTLY TRANSFERRED BETWEEN STORAGE DEVICES WITHOUT TRANSFERRING DATA TO MAIN MEMORY AND WITHOUT TRANSFERRING DATA OVER INPUT-OUTPUT BUS

TECHNICAL FIELD

The present invention relates to computer systems, and more particularly, to a method and apparatus for controlling the transfer of data to and from mass storage devices such as hard drives in computers.

BACKGROUND OF THE INVENTION

Personal computers ("PCs") typically employ multiple components, such as: (i) a processor for processing commands, (ii) a memory array for temporarily storing data, (iii) input devices such as keyboards and mice for inputting user commands, (iv) output devices such as visual display devices and printers for providing an output of visual data to users, and (v) mass storage devices such as hard and floppy disk drives for permanently storing data. The components are intercoupled by a bus. A basic input/output system ("BIOS") and operating system ("OS") generally control basic operation of the processor, the other components, and their interaction therebetween via the bus. Upon such a platform, the PC can perform various software applications, such as word processing, spreadsheet, database and other applications.

As software applications become longer and more complex, the PC must provide increased speed and performance so that the applications can run efficiently and without undue delays. Since the various computer components communicate through and share the bus, and since no two components can seize the bus concurrently, the bus has caused delays. As more components are attached to the bus, a propagation delay through the bus increases as the components coordinate to use the bus. More importantly, the bus becomes a bottleneck as the need for greater amounts of data to transfer along the bus exceed the capacity, or bandwidth, of the bus. "Bandwidth" typically refers to the number of bits per unit time that can be transferred along the bus.

One solution to the bottleneck caused by the bus, and thereby a solution to need for faster PCs, has been to create multiple bus hierarchies. Under such hierarchies, two or more buses are employed in the PC. Typically, a local or processor bus couples the processor and the memory array. An expansion or input/output ("I/O") bus couples the input/output devices and mass storage devices, such as hard drives. The processor and I/O buses communicate with each other via a bus interface or controller coupled therebetween.

The processor bus has a high bandwidth and thus is able to rapidly transfer data between the processor and the memory array. The I/O bus performs slower data transfers, such as writing data to, or reading data from, a disk drive, transferring data to a video or printer card for outputting data to a display device or printer, or other operations involving input and output devices ("peripheral devices"). When the processor requires data from, e.g., the hard drive, the processor issues a command to an I/O controller, which in turn, communicates to the hard drive to read the requested data. When the hard drive outputs the data to the I/O controller, the I/O controller notifies the processor that the requested data is now available. Thereafter, the processor receives the data, via the I/O and processor buses, to perform operations on the data or write it to the memory array. Such a transfer of data, however, requires the active intervention of the processor to transfer the data between the hard drive and the memory array. Since the processor is involved with transferring data, it cannot perform other tasks, which ultimately slows the PC's performance.

To improve the PC's speed, direct memory access ("DMA") techniques arose that allowed large volumes of data to be moved without significant processor intervention. When the processor desires to read or write a block of data, it issues a command to a DMA module, with at least the following information: (1) whether a read or write is requested, (2) an address of the device on the I/O bus involved in the transfer (e.g., the hard disk drive), (3) a starting location or address in the memory array to read data from or write data to, and (4) a number of words or bytes to be read or written. The processor then identifies an address to write data to or read data from on the hard disk. Thereafter, the processor is free to perform other tasks.

Concurrently, the DMA module issues the appropriate read and write commands and addresses to transfer an entire block of data, one word at a time, directly from the memory array to the hard disk, or vise versa, without further involving the processor. Whenever possible, the DMA module exchanges data along the slower I/O bus, allowing the processor to freely use the processor bus. When the data transfer is complete, the DMA module sends an interrupt signal to the processor indicating that the transfer is complete. The processor typically then ensures that all data was transferred successfully. Thus, the processor is involved only at the beginning and end of the data transfer. The processor, however, still must be involved during the DMA transfer. If data from one hard disk is to be transferred to another hard disk, the data must first be transferred to the memory array under one DMA transfer. Thereafter, the data must be transferred from the memory array to the second hard disk under a second DMA transfer. The processor would thus be involved at least four times during such a transfer between hard disk drives. Such involvement by the processor necessarily slows the performance of the PC.

To further speed performance of the PC, computer designers have attempted to increase the performance of the hard disk drives, which perform considerably slower than the processor. As is known, hard disk drives and other I/O devices require an interface or controller to permit communication between the processor and the I/O device. To help speed performance of the hard disk drive, and therefore provide improved PC performance, a hard disk drive interface, known as the Integrated Drive and Electronics ("IDE") interface was developed. The IDE interface transfers data from a hard disk to a bus at a maximum rate of 5 megabytes per second, which is faster than previous disk drive interfaces. Nevertheless, if large amounts of data are to be transferred, e.g., from a hard disk drive to a tape drive, the 5 megabyte rate will slow a PC computer and require most of the memory array and bus bandwidth to perform such a transfer.

To help improve PC performance, particularly when data is exchanged under such a disk drive to tape drive transfer (typically as a back-up system for data archival purposes), one known system expedited this transfer using the IDE interface. In U.S. Pat. No. 5,446,877, a data archival device allowed data to be written to a tape drive coupled to an IDE interface, while data was read from a disk drive coupled to the interface. A software routine managed access to the tape drive, as well as controlled the tape drive to seize the IDE interface only during periods when information was being communicated over the interface. Such a system, however, required certain routines, buffers, and control electronics, within the tape drive, which can be expensive and limited for use with the tape drive. The disclosed system is unavailable for transferring data between hard drives. Additionally, the system still requires data from the disk drive to be transferred first to the memory array, and then to the tape drive, thereby requiring processor intervention, memory in the array and bus bandwidth.

While the system disclosed in the '877 patent had certain limitations, such as requiring certain control electronics in the tape drive, it nevertheless was adaptable for use with the standard IDE interface. The IDE interface provided enhanced PC performance, but it still was considerably slower than the speed of most processors. Additionally, the IDE interface could accommodate only two drives. Users soon required not only a hard disk drive and a tape drive, but also two or more hard disk drives and other storage devices, such as compact disk, read-only memory ("CD-ROM") drives, and so on. Many of these devices could transfer data at a rate much greater than the 5 megabytes per second limitation of the IDE interface.

Recently, enhanced IDE ("EIDE") has become available, which allows up to four devices to be connected thereto, two devices coupled along a primary IDE interface or bus, and two coupled along a secondary IDE bus. Each bus can operate at a maximum rate of 16 megabytes per second, or possibly greater. The EIDE interface also allows for large DMA data transfers. Under such DMA transfers, the EIDE interface seizes the I/O bus and operates as a "bus master," functioning like the processor, to thereby allow large blocks of data to be transferred to and from the hard disk drive to the memory array without processor intervention.

The details on DMA transfers performed by EIDE controllers is described in detail in Small Form Factors Committee document SFF-8038i. In general, under such a DMA transfer, the processor stores a physical region descriptor ("PRD") table in the memory array that includes one or more PRDs. The PRDs describe one or more areas of memory in the memory array used in the DMA data transfer. Under a "scatter/gather" mechanism, large blocks of data can be scattered to various locations in the memory array (each identified by a separate PRD), and then gathered again for transfer back to a hard disk drive.

While the EIDE interface provides improved DMA transfers between a hard disk drive and the memory array, the CPU, nevertheless, must be employed to create the multiple PRD entries in the PRD table. Moreover, if a transfer from one hard disk drive to another were required, the processor would be involved twice during the transfer, once during transfer from the first drive to the memory array, and then from the memory array to the second drive. Such a data transfer between hard disk drives would necessarily tax not only the I/O bus, but also the processor bus to which the memory array is coupled. Moreover, large amounts of memory in the main memory array are required for large data transfers.

SUMMARY OF THE INVENTION

The present invention provides for the direct transferring of data from one mass storage device, such as a hard disk drive, to another storage device, without first storing the data in a main memory array. The present invention can employ existing EIDE controllers, with some minimal adaptation, to thereby provide a data transfer system between hard disk drives that is readily adaptable for use in existing PCs without significant additional circuitry or configuration. Thus, the present invention can be produced at a cost that does not significantly exceed the cost of existing EIDE interfaces.

In operation, data from one disk drive on one of the primary or secondary IDE buses is routed through the EIDE controller, via a block move bus, to another disk drive on the other IDE bus. The processor in the host PC need only initialize the transfer with a few commands. Thereafter, the EIDE controller of the present invention performs all block data transfers between disk drives, without additional processor involvement or bandwidth on the processor or I/O busses.

In a broad sense, the present invention embodies a computer system having a processor, first and second data input-output devices (such as hard disk drives), a computer bus coupled to the processor, and a data storage device controller. The data storage device controller includes first and second device controllers coupled to the first and second storage devices, respectively. The first and second device controllers are coupled to the computer bus and are capable of exchanging data between the processor and the first and second storage devices. The data storage device controller also includes a data move bus coupled between the first and second device controllers. The data move bus permits data from the first storage device to be directly transferred to the second storage device.

The present invention also embodies a method of performing block data transfers between first and second data storage devices in a computer system. The computer system includes a processor, a memory array, a computer bus intercoupling the processor and the memory array, and a data storage controller coupling the first and second data storage devices to the processor. The method includes the steps of: (a) initiating a transfer of data between the first and second data storage devices under the control of the processor; (b) providing control of the first and second data storage devices to the data storage device controller; (c) transferring data directly between the first and second data storage devices under control of the data storage device controller, without employing the memory array and computer bus; and (d) restoring control of the first and second data storage devices to the processor.

The present invention solves problems inherent in the prior art, and provides additional advantages, by providing an EIDE controller capable of directing blocks of data read from a first storage device coupled to one EIDE channel directly to a second storage device on another EIDE channel. Such a block move allows for a direct movement of blocks of data between storage devices without processor intervention, and without using I/O or processor bus bandwidth. Various features and advantages of the present invention will become apparent to those skilled in the art from studying the following detailed description of the presently preferred embodiments, together with the following drawings.

DETAILED DESCRIPTION OF THE INVENTION

Figure 1:
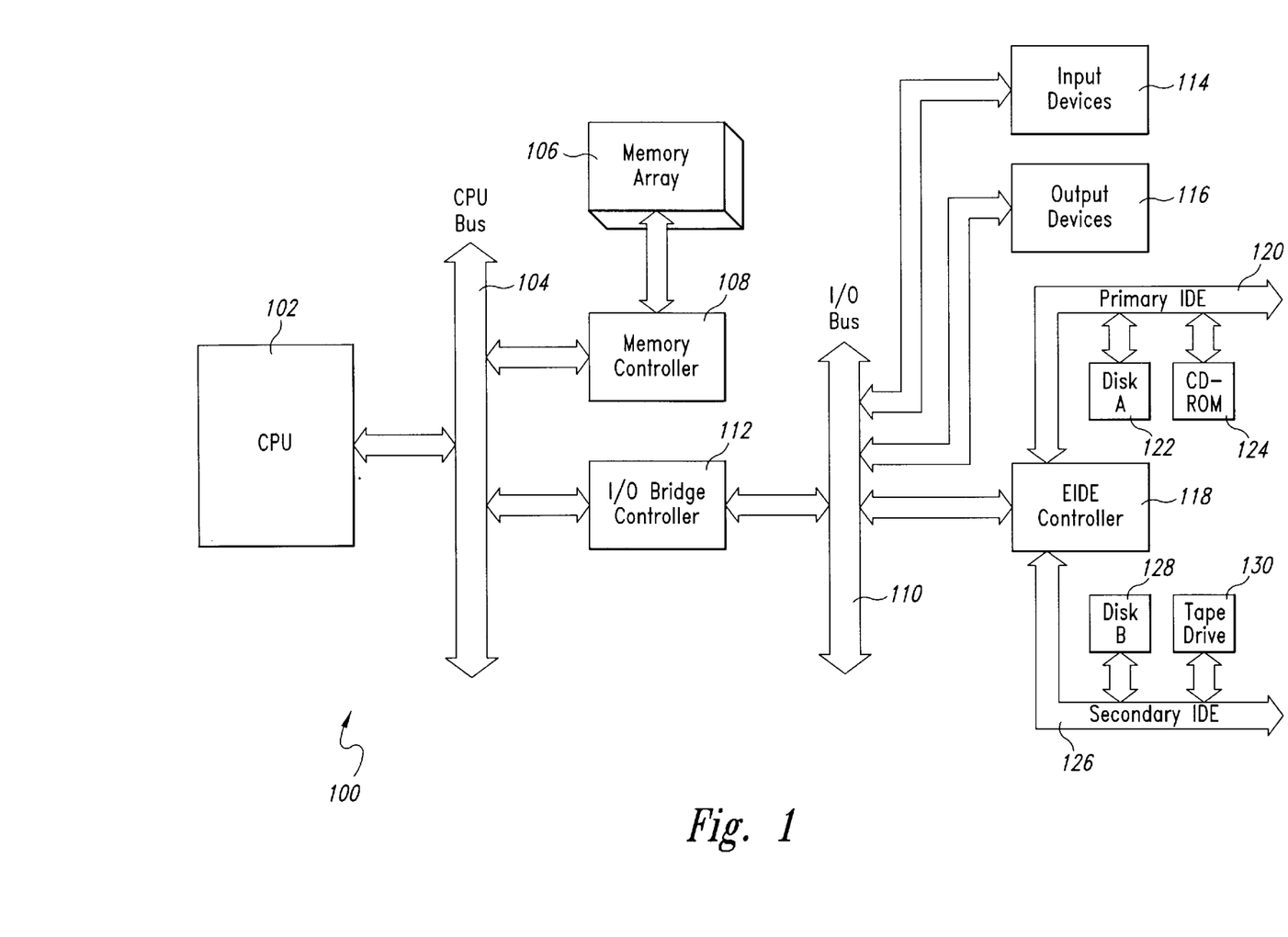
FIG. 1 is a block diagram of a computer system having an EIDE controller under the present invention.

Referring to FIG. 1, a computer system 100, such as an IBM compatible personal computer ("PC") includes a processor or central processing unit ("CPU") 102 coupled to a CPU bus 104. A main memory array 106 is coupled to the CPU bus 104 through a memory controller 108. The memory array 106 can include any of various known memory devices, such as DRAM devices manufactured by Micron Technology, Inc. An input/output ("I/O") bus 110 is coupled to the CPU bus 104 through an I/O bridge controller 112. The I/O bus 110 can be selected from known bus designs, such as the peripheral component interconnect ("PCI") bus.

The CPU bus 104 preferably has a bandwidth greater than the bandwidth of the I/O bus 110. The I/O bridge controller 112 monitors bus traffic on the CPU and I/O buses 104 and 110, and routes data therebetween when it detects appropriate transfer commands on either of the buses. The I/O bridge controller 112 also translates data between the buses, particularly when the CPU and I/O buses 104 and 110 have different widths, employ different formats, etc. One or more input devices 114, such as a keyboard, mouse, etc., are coupled to the I/O bus 110. Similarly, one or more output devices 116, such as visual display devices, printers, etc., are coupled to the I/O bus 110.

An EIDE controller 118 is coupled to the I/O bus 110. A primary IDE bus or channel 120 couples the EIDE controller 118 to a first set of data storage devices, such as a first hard disk drive 122 and a CD-ROM drive 124. Similarly, a secondary IDE bus or channel 126 couples the IDE controller 118 to a second set of data storage devices, such as a second hard disk drive 128 and a tape drive 130. The terms "bus" and "channel" are generally used interchangeably herein with respect to the primary and secondary IDE channels 120 and 126. Except as described in detail below, the various components of the computer system 100 are of known construction and operation, and therefore need not be described in further detail herein.

Figure 2:
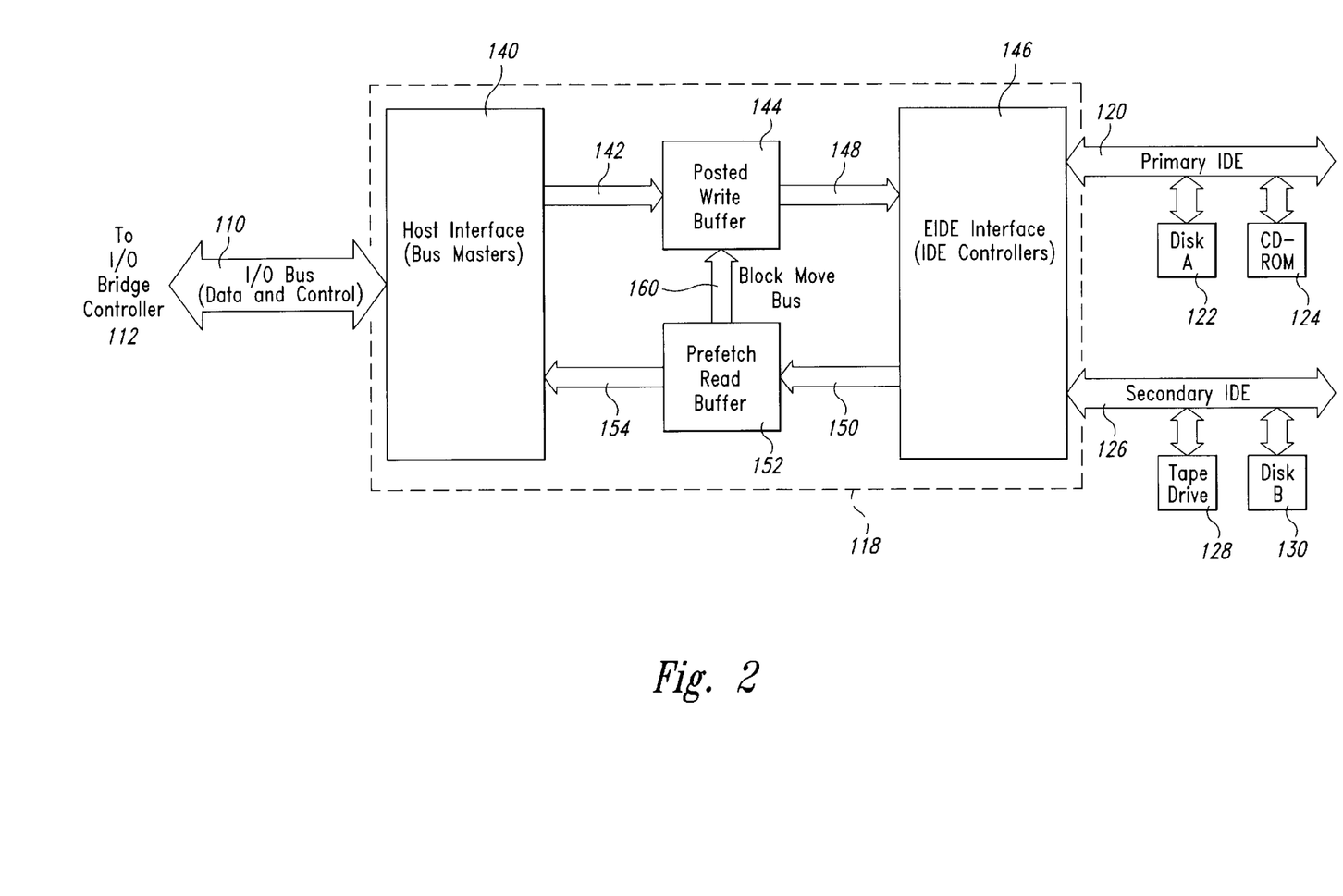
FIG. 2 is a block diagram of the EIDE controller of the present invention, and I/O and EIDE buses coupled thereto.

Referring to FIG. 2, the EIDE controller 118 includes a host interface 140 that communicates with the CPU 102 via the I/O bus 110. If, for example, the CPU 102 wishes to write data to the first or second hard disk drives 122 or 130, then the CPU (described below) initially sends the host interface 140 an appropriate command followed by the data to be written to the selected drive. The host interface 140 transfers the data to a posted write buffer 144 on an internal data-in bus 142 coupled therebetween. An EIDE interface 146 receives the data stored in the write buffer 144 from an internal write bus 148 coupled therebetween. The EIDE interface 146 then outputs the data on the primary or secondary IDE channels 120 or 126, and commands the first or second hard disk drives 122 or 130 to write the data thereto, respectively.

During a read operation, the CPU sends the host interface 140 an appropriate command. The EIDE interface 146 then receives data from the first or second hard disk drives 122 or 130, CD-ROM drive 124 or tape drive 128, and routes the data to a pre-fetch read buffer 152 on an internal read bus 150 coupled therebetween. The read buffer 152, in turn, provides the data to the host interface 140 on a data-out bus 154 coupled therebetween. The host interface 140 then outputs the data on the I/O bus 110 for use by the CPU 102, stored in the memory array 106, etc. Importantly, under the appropriate commands, the host interface 140 and EIDE interface 146 can cause data read from one of the data storage devices (i.e., hard disk drives 122, 130, CD ROM drive 124 or tape drive 128), to be routed from the read buffer 152 to the write buffer 144, on a block move bus 160 coupled therebetween. As explained more fully below, such a data transfer is performed without using the I/O bus 110 or the CPU bus 104. The data is then written from the write buffer 144 to the first or second disk drives 122 or 130, or tape drive 128. As a result, such a block move of data between devices on the primary and secondary IDE channels 120 and 126 does not require processing time by the CPU 102, memory in the memory array 106, or bandwidth of the CPU and I/O buses 104 and 110.

Figure 3:
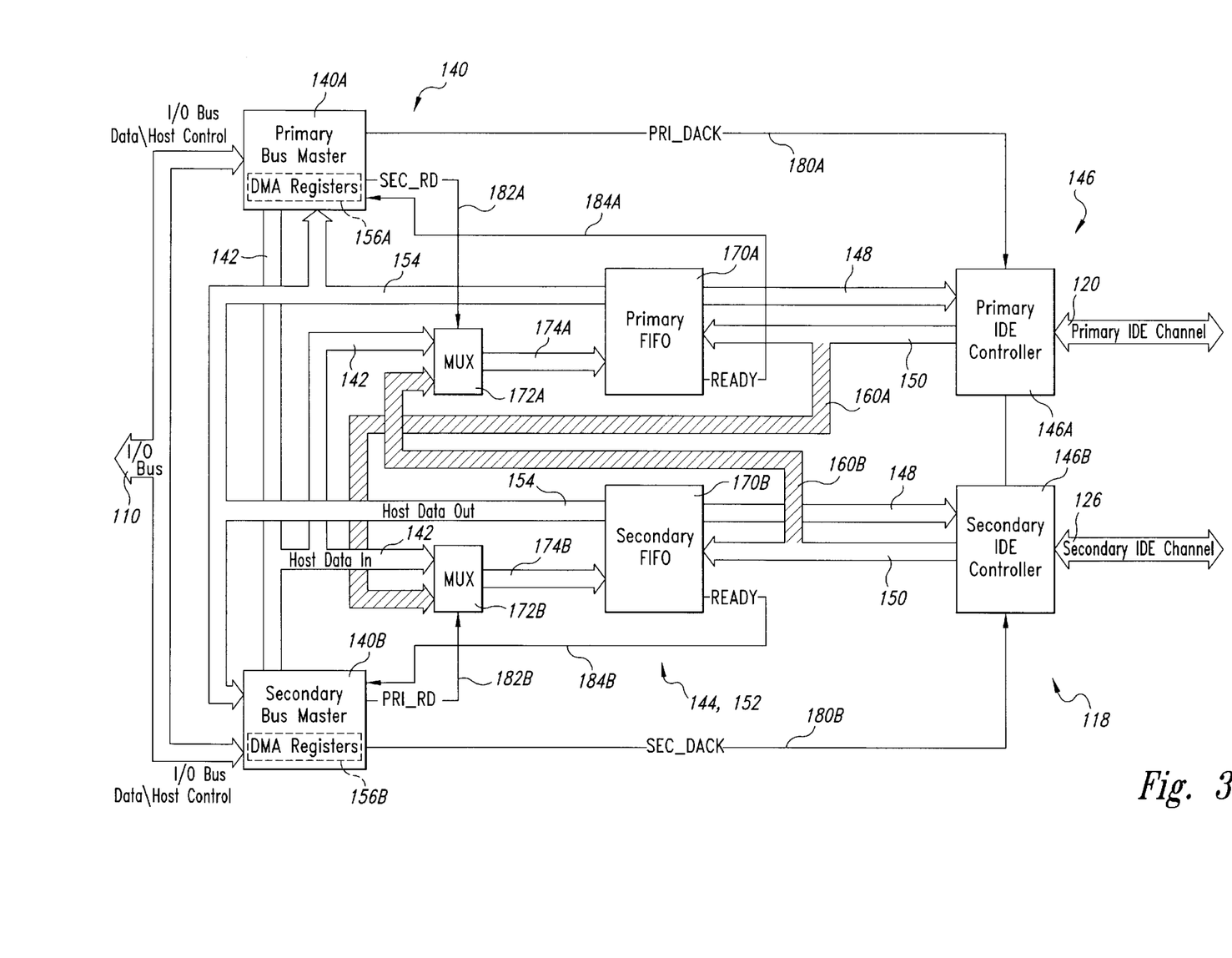
FIG. 3 is a detailed block diagram of the EIDE controller of FIG. 2.

Referring to FIG. 3, the EIDE controller 118 of the present invention is shown in more detail. As shown in FIG. 3, the host interface 140 of FIG. 2 includes a primary bus master 140A and a secondary bus master 140B. Similarly, the EIDE interface 146 of FIG. 2 includes a primary IDE controller 146A and a secondary IDE controller 146B. A primary first in, first out ("FIFO") buffer 170A and primary multiplexer 172A perform the functions of the write buffer 144 and read buffer 152 of FIG. 2. Likewise, a secondary FIFO 170B and secondary multiplexer 172B similarly perform the functions of the write buffer 144 and read buffer 152.

As explained more fully below, the primary and secondary bus masters 140A and 140B include DMA registers 156A and 156B, respectively, that are employed under the present invention to facilitate block data transfers between the primary and secondary channels 120 and 126. Except as described in detail herein, the DMA registers 156A and 156B, primary and secondary bus masters 140A and 140B, primary and secondary IDE controllers 146A and 146B, and primary and secondary FIFOs 170A and 170B are of known construction and are present in currently available IDE controllers. As a result, except for the software and hardware changes described below, the present invention is adaptable for use with most currently available EIDE controllers.

Figure 4:
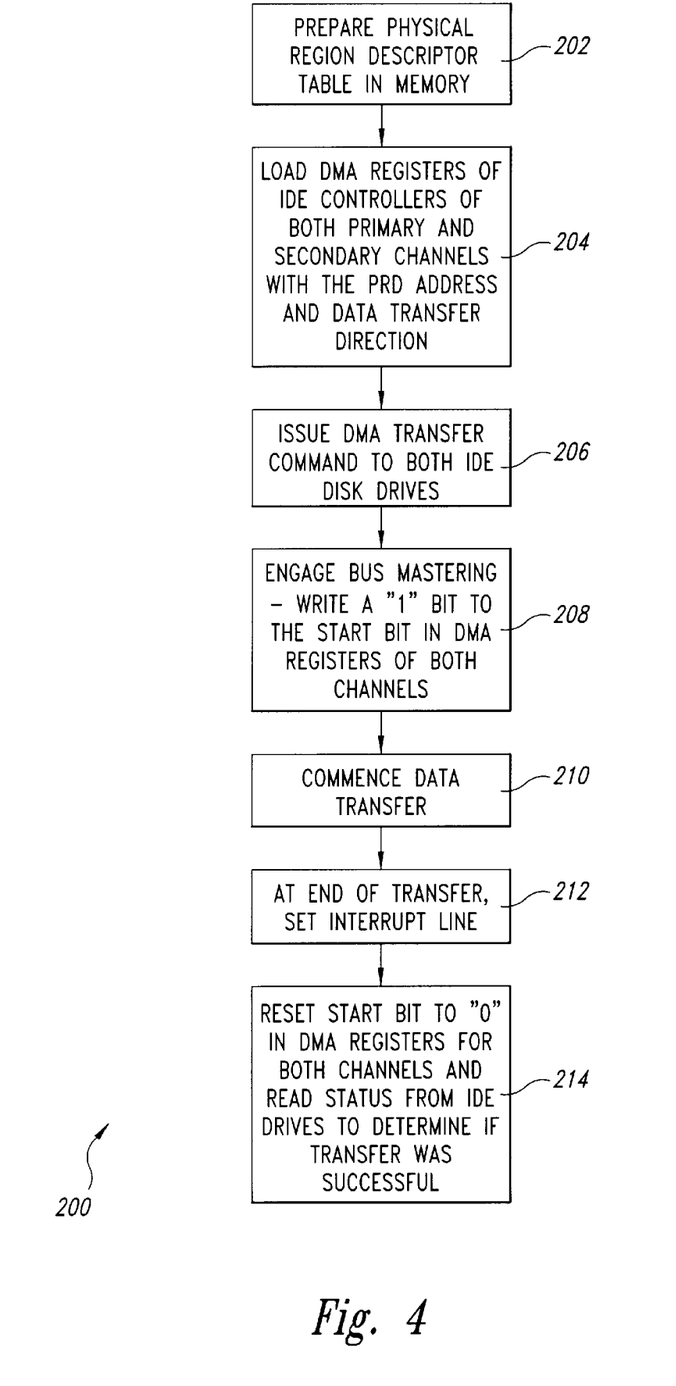
FIG. 4 is a flowchart showing the steps performed by the computer system of FIG. 1 under a block data transfer.
Figure 5:
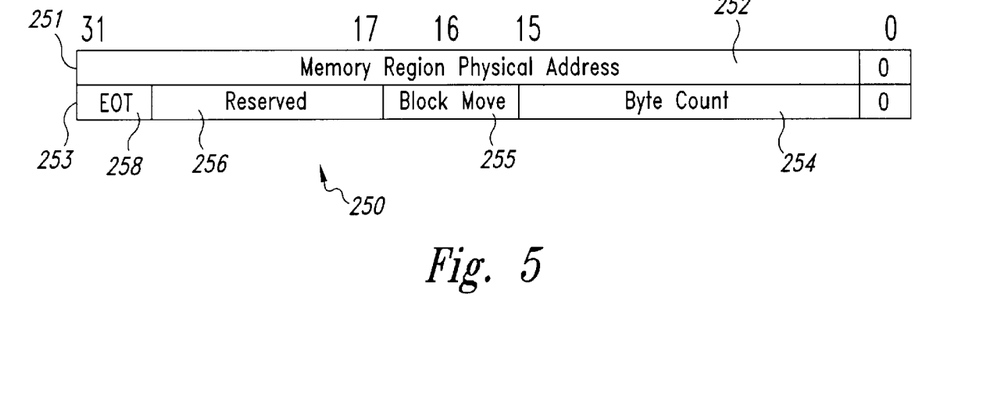
FIG. 5 is an exemplary data structure for enabling the block data transfer under the present invention.

Referring to the flowchart of FIG. 4, the operation of a block data move routine 200 under the present invention will now be described in conjunction with FIG. 3. The block move routine 200 is essentially a DMA transfer, except that the memory array 106 (FIG. 1) is not employed during the actual data transfer. The routine 200 begins in step 202 where the CPU 102 initiates the block data transfer by preparing a physical region descriptor ("PRD") table in the memory array 106. Referring to FIG. 5, an exemplary PRD data structure 250 for each entry in the PRD table is shown. As noted above, the PRD data structure 250 defines the elements necessary for DMA data transfers. The PRD data structure 250 includes a first 4 byte data structure 251 and a second 4 byte data structure 253. The first 4 byte data structure 251 includes an initial bit 0 always having a value of 0, followed by a memory region physical address section 252 (for bit 1 through bit 31). As is known, all PRD data structures employed in EIDE DMA transfers include such a memory region physical address data section 252 that defines the initial address at which data is to be written to, or read from, the memory array 106. Under the present invention, however, the memory region physical address section 252 is irrelevant, and can have any value. Under the block move routine 200 of the present invention, data is not written to or from the memory array 106.

The second 4 byte data structure 253 also includes an initial bit 0 having a value of 0, followed by a byte count section 254 (for bit 1 through bit 15). The byte count section 254 identifies the number of bytes to be moved under the block move routine 200. The next bit in the second 4 byte data structure 253, bit 16, is a block move bit 255. When the block move bit 255 is set to a 1 value, then the bus masters 140A and 140B of the EIDE controller recognize that the data to be moved under the block move routine 200 is not to be transferred to and from the memory array 106 (as in a typical DMA transfer), but instead is to be transferred between primary and secondary IDE channels 120 and 126. In other words, if data read from the first hard disk drive 122 in the primary IDE channel 120 is to be transferred, and the block move bit 255 is set to a 1 value, then the bus masters recognize that the data is to be transferred to the opposite IDE channel, i.e., the secondary IDE channel 126.

A reserved section 256 follows the block move bit 255 in the second 4 byte data structure 253. As is known, multiple PRD data structures 250 can be linked together to form the PRD table and provide movement of data under a scatter/gather mechanism. Thus, an end of table ("EOT") bit 258 in the last bit (i.e., bit 31) of the second four byte data word 253 indicates to the bus masters 140A and 140B that a given PRD data structure 250 is the last PRD data structure in the PRD table. In summary, except for the block move bit 255, the PRD data structure 250 is conventional and can thus be readily employed with existing EIDE systems and software.

Referring back to FIG. 4, in step 204, the CPU 102 loads the DMA registers 156A and 156B of the primary and secondary bus masters 140A and 140B with the initial address of the PRD table in the memory array 106, and the direction of data transfer. By loading the DMA registers 156A and 156B, the primary and secondary bus masters 140A and 140B can control data transfers in a manner similar to that of the CPU 102. The bus masters 140A and 140B can request and access the PRD data structures 250 in the PRD table (stored within the memory array 106) to thereby determine the byte count for the data to be read from, and written to, the devices on the primary and secondary IDE channels 120 and 128.

In step 206, the CPU 102 issues a DMA transfer command to a first selected device on the primary or secondary IDE channels 120 or 126 (e.g., the first hard disk drive 122), and a transfer command to a second selected device on the other IDE channel (e.g., the second hard disk drive 128). The DMA transfer command from the CPU 102 includes an address at which data is to be read from the first selected device, and an address at which data is to be written to the second selected device. In step 208, the CPU 102 provides control of the first and second hard disk drives to the EIDE controller 118 by writing a one bit to a start bit in the DMA registers 156A and 156B, which causes the bus masters 140A and 140B to initiate the block data transfer. In step 210, the EIDE controller 118 commences the block data transfer, as described in more detail below with respect to FIG. 6. At the end of the block data transfer, in step 212, the primary and secondary bus masters 140A and 140B issue an appropriate interrupt on the I/O bus 110. In step 214, in response to the interrupt, the CPU 102 writes a zero to the start bit in the DMA registers 156A and 156B, which causes the bus masters 140A and 140B to end the block data transfer. In step 214, the CPU 102 also reads a status signal from the first and second selected devices on the primary and secondary IDE channels 120 and 126 to determine if the data transfer was successful. If not, the block move routine 200 can be repeated.

In general, except for step 210, the remaining steps in the block move routine 200 are conventional steps performed for DMA transfers under EIDE controllers involving only one of the primary or secondary IDE channels 120 and 126. Under the block data transfer routine 200 of the present invention, however, the steps 202–208 and 212–214 are performed for both the primary and secondary channels 120 and 126. In essence, the primary bus master 140A and primary IDE controller 146A, and the secondary bus master 140B and secondary IDE controller 146B, perform typical DMA transfers, except that the DMA transfers are performed simultaneously for both the primary and secondary IDE channels. Additionally, the data transferred is simply rerouted between the channels along either the primary or secondary block move bus 160A or 160B, without leaving the EIDE controller 118. As with typical DMA transfers, the CPU 102 is involved during only the performance of steps 202–208 and 214. However, the most time-consuming step, step 210, is performed exclusively by the EIDE controller 118, thereby allowing the CPU 102 to perform additional tasks, and without using substantial amounts of memory in the memory array 106 or bandwidth on the I/O bus 110.

Figure 6:
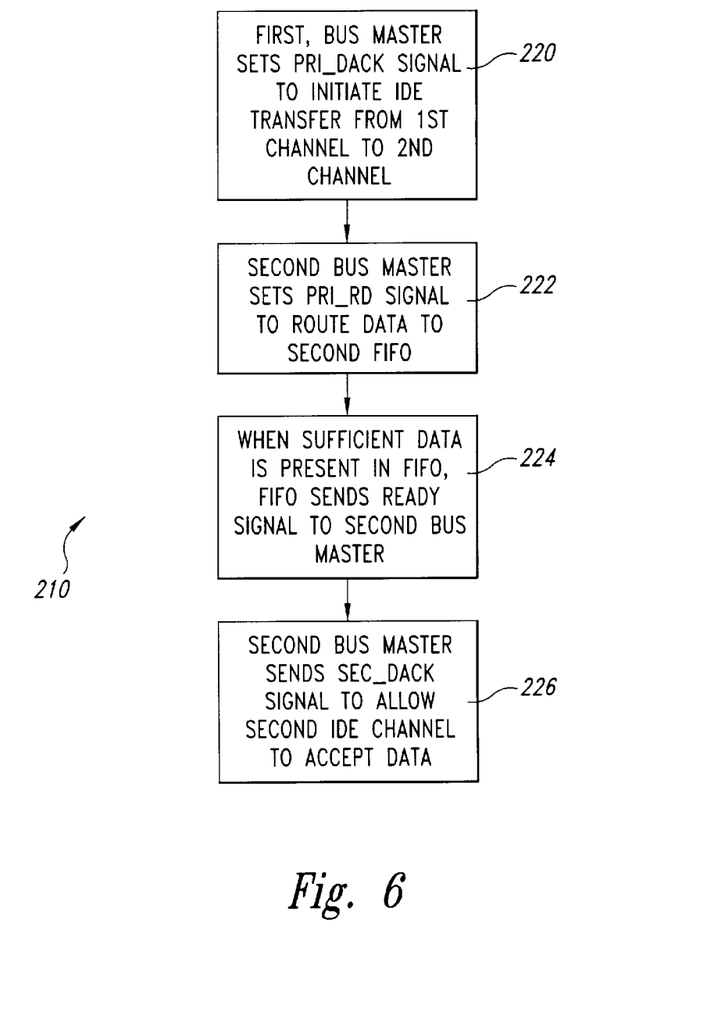
FIG. 6 is a flowchart showing the steps performed by the EIDE controller of FIG. 3.

Referring to FIG. 6, the step 210 of performing the actual block data transfer is shown in more detail in steps 220–226. In step 220, the primary bus master 140A provides a primary data acknowledgment signal PRI_DACK on a line 180A (FIG. 3) to the primary IDE controller 146A and initiates block data transfer from the primary IDE channel 120 to the secondary IDE channel 126. In step 222, the secondary bus master 140B provides a primary read data signal PRI_RD on a line 182B to the secondary multiplexer 172B. In response thereto, the secondary multiplexer 172B switches from accepting incoming data from the data-in bus 142, to accepting data from a primary block move bus 160A coupled between the primary internal read bus 150. The first hard disk drive 122 then outputs data read therefrom on the primary IDE channel 120, through the primary IDE controller 126A, primary block move bus 160A, secondary multiplexer 172B and secondary bus 174B, for storage in the secondary FIFO 170B.

In step 224, when sufficient data is present in the secondary FIFO 170B, the secondary FIFO provides a ready signal READY on a line 184B to the secondary bus master 140B. In step 226, the secondary bus master 140B, in response to the READY signal, provides a secondary data acknowledgment signal SEC_DACK on a line 180B to the secondary IDE controller 146B. In response thereto, the secondary IDE controller 146B routes the data from the secondary FIFO 170B to the second hard disk drive 130 on the secondary internal write bus 148 and secondary IDE channel 126. The second hard disk drive 130 then stores the data thereon.

The steps 220–226 are generally described above for an exemplary transfer of data from the first hard disk drive 122 on the primary IDE channel 120 to the second hard disk drive 130 on the secondary IDE channel 126. The previous discussion, however, is equally applicable to transfers from a selected device on the secondary IDE channel 126 to a selected device on the primary IDE channel 120.

For example, data from the second hard disk drive 130 is transferred through the secondary IDE controller 146B, secondary block move bus 160B, primary multiplexer 172A, primary bus 174A, primary FIFO 170A, primary IDE controller 146A, and primary IDE channel 120 to be written on the first hard disk drive 122. Such a transfer occurs in response to (i) the secondary data acknowledgment signal SEC_DACK 180B, (ii) a secondary read data signal SEC_RD 182A provided by the primary bus master 140A to the primary multiplexer 172A on a line 182A, (iii) a ready signal READY from the primary FIFO 170A to the primary bus master on a line 184A, and (iv) the signal PRI_DACK.

In summary, under the block move routine 200 of the present invention, the CPU 102 need only set the EIDE controller 118 into a block move state by performing steps 202–208. In response thereto, the EIDE controller sets the primary or secondary multiplexer 172A or 172B to accept data from the secondary or primary block move buses 160B or 160A, respectively. Thereafter, the CPU 102 sends read and write commands to separate devices on the primary and secondary IDE channels 120 and 126 to allow one device to read, and the other device to write, strictly through the EIDE controller 118. Thereafter, the CPU 102 can perform other tasks, and exclusively use the CPU and I/O buses 104 and 110. In general, the EIDE controller 118 operates under additional control signals and circuits, e.g., control lines for directing the direction of data transfer to and from the primary and secondary FIFOs 170A and 170B. Such additional signals and circuits are not described in detail herein for reasons of brevity and clarity, and because such signals and circuits are not critical to an understanding of the present invention.

While the detailed description has been expressed, in part, in terms of specific examples, those skilled in the art will appreciate that many other variations are available which could be used to accomplish the purpose of the disclosed invention. For example, those skilled in the art will recognize that while the present invention has been described above for transferring data between hard disk drives, the invention can be readily adapted to provide data exchange between other input-output devices, such as from the CD-ROM drive 124 to the tape drive 130, or from a modem. Accordingly, it can be appreciated that equivalent modifications to the above-described embodiments can be made without departing from the spirit and scope of the invention. Therefore, the present invention is limited only by the following claims.

I claim:

1. In a computer system having a processor, a main memory, first and second data input-output devices coupled to an input-output bus, and a computer interface bus coupled to the processor, wherein the first and second input-output devices are coupled to first and second secondary buses, respectively, a data device controller comprising:

a first device controller coupled to the first and second input-output devices, wherein at least one of the input-output devices is a mass data storage device, and wherein the first device controller is coupled to the computer interface bus and is capable of exchanging data between the processor and each of the first and second input-output devices over the computer interface bus; and a bi-directional data move device connected between the first and second secondary buses, and coupled between the first and second input-output devices and permitting data to be directly transferred between the first and second input-output devices without first transferring the data to the main memory, and without transferring the data over the computer interface bus or over the input-output bus.

2. The data device controller of claim 1, further comprising a second device controller coupled to the computer interface bus, wherein the first input-output device is coupled to a first data channel and the second input-output device is coupled to a second data channel, wherein the first data channel is coupled to the first device controller, and wherein the second device controller is coupled to the second data channel;

wherein the data device controller further comprises a processor interface coupled to the computer interface bus and the first and second device controllers, the processor interface receiving data from and sending data to the processor via the computer interface bus; and wherein the data move device includes a buffer circuit and a data move bus intercoupling the buffer circuit with the first and second device controllers.

3. The data device controller of claim 1, further comprising a processor interface coupled to the computer interface bus, and wherein the data move device includes a write buffer coupled between the processor interface and the first device controller, a read buffer coupled between the processor interface and the first device controller, and a block move bus coupled between the write buffer and the read buffer.

4. The data device controller of claim 3, further comprising a second device controller, wherein the processor interface includes first and second bus master circuits, wherein the first input-output device is coupled to a first data channel and the second input-output device is coupled to a second data channel, wherein the first and second data channels are coupled to the first and second device controllers, respectively, wherein the block move bus includes first and second data move buses, and wherein the write and read buffers include:

first and second buffer circuits coupled to the first and second device controllers, respectively;

a first multiplexer coupled to the first bus master circuit, the computer interface bus, the second data move bus and the first buffer circuit, the first multiplexer selectively coupling the second data move bus to the first buffer circuit responsive to a first routing signal from the first bus master circuit, wherein the first buffer circuit is coupled between the first multiplexer and the first device controller; and a second multiplexer coupled to the second bus master circuit, the computer bus, the first data move bus and the second buffer circuit, the second multiplexer selectively coupling the first data move bus to the second buffer circuit responsive to a second routing signal from the second bus master circuit, and wherein the second buffer circuit is coupled between the second multiplexer and the second device controller.

5. The data device controller of claim 1, further comprising a processor interface coupled to the computer interface bus, and wherein the data move device includes a data move bus, a multiplexer coupled to the processor interface and the data move bus, and a buffer circuit coupled between the multiplexer and the first device controller, the multiplexer selectively coupling the first data move bus to the first buffer circuit responsive to a routing signal from the processor interface and allowing data from the second input-output device to directly transfer data to the first input-output device.

6. The data device controller of claim 1 wherein the first and second input-output devices are hard disk drives, and wherein the first device controller is an EIDE-type controller.

7. The data device controller of claim 1 wherein the first input-output device is a hard disk drive, CD-ROM drive, or tape drive.

8. In a computer system having a processor, a memory array, first and second data storage devices and a computer interface bus intercoupling the processor, memory array and first and second data storage devices coupled to an input-output bus, and wherein the first and second data storage devices are coupled to first and second secondary buses, respectively, a data storage device controller comprising:

a processor interface coupled to the computer bus, the processor interface receiving data from and sending data to the processor via the computer interface bus;

a storage device interface coupled to the processor interface and the first and second storage devices via the first and second secondary buses, respectively, and exchanging data between the first storage device and the processor interface and between the second storage device and the processor interface, and wherein at least one of the first and second storage devices is a mass data storage device;

a first buffer circuit coupled between the processor interface and the storage device interface; and a first data move bus coupled between the storage device interface and the first buffer circuit, the first data move bus and storage device interface permitting data to be directly transferred between the first and second storage devices, without the data being stored in the memory array and without transferring the data over the input-output bus.

9. The data storage device controller of claim 8 wherein the storage device interface includes first and second device controllers, wherein the first storage device is coupled to a first data channel and the second storage device is coupled to a second data channel, and wherein the first and second data channels are coupled to the first and second device controllers, respectively, wherein the processor interface includes first and second bus master circuits, wherein the first storage device is coupled to the first data move bus via the first data channel and first device controller, and wherein the data storage device controller further includes:

a second data move bus coupled to the second storage device via the second data channel and second storage device controller;

a first multiplexer coupled to the first bus master circuit, the computer bus, the second data move bus and the first buffer circuit, the first multiplexer selectively coupling the second data move bus to the first buffer circuit responsive to a first routing signal from the first bus master circuit, wherein the first buffer circuit is coupled between the first multiplexer and the first device controller;

a second buffer circuit coupled to the second device controller; and a second multiplexer coupled to the second bus master circuit, the computer bus, the first data move bus and the second buffer circuit, the second multiplexer selectively coupling the first data move bus to the second buffer circuit responsive to a second routing signal from the second bus master circuit.

10. The data storage device controller of claim 8, further comprising a multiplexer coupled to the processor interface, the computer bus, the first data move bus and the first buffer circuit, the multiplexer selectively coupling the first data move bus to the first buffer circuit responsive to a routing signal from the processor interface and allowing the second storage device to directly transfer data to the first storage device without routing the data on the computer bus.

11. The data storage device controller of claim 8 wherein the first and second storage devices are hard disk drives, wherein the data storage device controller is an EIDE-type controller, and wherein the processor interface includes DMA registers for storing DMA commands from the processor to initiate data transfer from the first storage device to the second storage device, without the data first being stored in the memory array.

12. The data storage device controller of claim 8 wherein the first storage device is a hard disk drive, CD-ROM drive, or tape drive.

13. In a computer system having a processor, a memory array, first and second data storage devices coupled to an input-output bus and a computer bus coupled to the processor, wherein the first and second data storage devices are coupled to first and second channels, respectively, a data storage device controller comprising:

a processor interface coupled to the computer bus and exchanging data between the data storage device controller and the processor via the computer bus;

first and second device controllers coupled to the first and second storage devices via the first and second channels, respectively, the first and second device controllers being coupled to the processor interface and exchanging data between the processor interface and the first and second storage devices, and wherein at least one of the first and second storage devices is a mass data storage device; and a first data move bus coupled between the first and second channels, and between first and second device controllers and permitting data to be transferred between the first and second storage devices, without employing the computer bus or the input-output bus and without first transferring the data to the memory array.

14. The data storage device controller of claim 13 wherein the first storage device is coupled to a first data channel and the second storage device is coupled to a second data channel, and wherein the first and second data channels are coupled to the first and second device controllers, respectively, wherein the processor interface includes first and second bus master circuits, wherein the first storage device is coupled to the first data move bus via the first data channel and first device controller, and wherein the data storage device controller further includes:

a first buffer circuit coupled between the processor interface and the first storage device controller;

a second data move bus coupled to the second storage device via the second data channel and second storage device controller;

a first multiplexer coupled to the first bus master circuit, the computer bus, the second data move bus and the first buffer circuit, the first multiplexer selectively coupling the second data move bus to the first buffer circuit responsive to a first routing signal from the first bus master circuit, wherein the first buffer circuit is coupled between the first multiplexer and the first device controller;

a second buffer circuit coupled to the second device controller; and a second multiplexer coupled to the second bus master circuit, the computer bus, the first data move bus and the second buffer circuit, the second multiplexer selectively coupling the first data move bus to the second buffer circuit responsive to a second routing signal from the second bus master circuit.

15. The data storage device controller of claim 13, further comprising a multiplexer coupled to the processor interface, the computer bus, and the first data move bus, and a first buffer circuit coupled between the first multiplexer and the first device controller, the multiplexer selectively coupling to the first data move bus the first buffer circuit responsive to a routing signal from the processor interface and allowing data from the second storage device to directly transfer data to the first storage device without routing the data on the computer bus.

16. The data storage device controller of claim 13 wherein the first and second storage devices are hard disk drives, wherein the data storage device controller is an EIDE-type controller, and wherein the processor interface includes DMA registers for storing DMA commands from the processor to initiate data transfer from the first storage device to the second storage device, without first being transferred on the computer bus.

17. The data storage device controller of claim 13 wherein the first storage device is a hard disk drive, CD-ROM drive, or tape drive.

18. A computer system comprising:
    a processor;
    a memory array;
    a computer bus intercoupling the processor and the memory array;
    first and second secondary buses;
    a first data storage device;
    a second data storage device, wherein the first and second data storage devices are coupled to the first and second secondary buses, respectively, and wherein at least one of the first and second storage devices is a mass data storage device;
    an input-output bus coupled to the first and second data storage devices; and
    a bi-directional data storage device controller comprising:
        a processor interface coupled to the computer bus and exchanging data between the data storage device controller and the processor via the computer bus;
        a storage device interface coupled to the processor interface and the first and second storage devices via the first and second secondary buses, respectively, and exchanging data between the first and second storage devices and the processor interface;
        a first buffer circuit coupled between the processor interface and the storage device interface; and
        a first data move bus coupled between the storage device interface and the first buffer circuit, the first data move bus and storage device interface permitting data to be directly transferred between the first and second storage devices without transferring the data to the memory array or over the computer bus, or input-output bus.

19. The computer system of claim 18 wherein the storage device interface includes first and second device controllers, wherein the first storage device is coupled to a first data channel and the second storage device is coupled to a second data channel, and wherein the first and second data channels are coupled to the first and second device controllers, respectively,
    wherein the processor interface includes first and second bus master circuits, wherein the first storage device is coupled to the first data move bus via the first data channel and first device controller, and
    wherein the data storage device controller further includes:
        a second data move bus coupled to the second storage device via the second data channel and second storage device controller;
        a first multiplexer coupled to the first bus master circuit, the computer bus, the second data move bus and the first buffer circuit, the first multiplexer selectively coupling the second data move bus to the first buffer circuit responsive to a first routing signal from the first bus master circuit, wherein the first buffer circuit is coupled between the first multiplexer and the first device controller;
        a second buffer circuit coupled to the second device controller; and
        a second multiplexer coupled to the second bus master circuit, the computer bus, the first data move bus and the second buffer circuit, the second multiplexer selectively coupling the first data move bus to the second buffer circuit responsive to a second routing signal from the second bus master circuit.

20. The computer system of claim 18, further comprising a multiplexer coupled to the processor interface, the computer bus, the first data move bus and the first buffer circuit, the multiplexer selectively coupling the first data move bus to the first buffer circuit responsive to a routing signal from the processor interface and allowing the second storage device to directly transfer data to the first storage device without routing the data on the computer bus.

21. The computer system of claim 18 wherein the first and second storage devices are hard disk drives, wherein the data storage device controller is an EIDE-type controller, and wherein the processor interface includes DMA registers for storing DMA commands from the processor to initiate data transfer from the first storage device to the second storage device, without the data first being stored in the memory array.

22. The computer system of claim 18 wherein the first data storage device is a hard disk drive, CD-ROM drive, or tape drive.

* * * * *